United States Patent [19]

Russell et al.

[11] Patent Number: 5,500,576
[45] Date of Patent: Mar. 19, 1996

[54] LOW HEIGHT BALLAST FOR FLUORESCENT LAMPS

[75] Inventors: Randy G. Russell, Glen Ellyn; Kent E. Crouse, Hanover Park; Peter W. Shackle, Arlington Heights; Ronald J. Bezdon, Antioch, all of Ill.

[73] Assignee: Energy Savings, Inc., Schaumburg, Ill.

[21] Appl. No.: 227,953

[22] Filed: Apr. 15, 1994

Related U.S. Application Data

[63] Continuation-in-part of Ser. No. 148,295, Nov. 8, 1993.

[51] Int. Cl.[6] ........................... H05B 37/02
[52] U.S. Cl. ............... 315/307; 315/206; 315/209 R; 315/DIG. 5
[58] Field of Search .................. 315/206, 219, 315/307, 247, 244, DIG. 5, DIG. 7, 225, 209 R, 291, 308; 363/34, 37, 44, 45, 46, 50

[56] References Cited

U.S. PATENT DOCUMENTS

| | | | |
|---|---|---|---|
| 4,251,752 | 2/1981 | Stolz | 315/206 |
| 4,277,728 | 7/1981 | Stevens | 315/307 |
| 4,523,131 | 6/1985 | Zansky | 315/307 |
| 4,562,383 | 12/1985 | Kerscher et al. | 315/225 |
| 5,214,355 | 5/1993 | Nilssen | 315/219 |
| 5,363,020 | 11/1994 | Chen et al. | 315/209 R |

*Primary Examiner*—Robert J. Pascal
*Assistant Examiner*—David Vu
*Attorney, Agent, or Firm*—Cahill, Sutton & Thomas

[57] ABSTRACT

An electronic ballast has a high voltage portion and a low voltage portion. The high voltage portion includes a converter, having a variable frequency boost circuit, and a half-bridge, driven inverter having a series resonant, direct coupled output. The low voltage portion of the ballast includes a control circuit and fault detectors for shutting off the boost circuit and the inverter circuit. The fault detectors consume very little power when the ballast and lamp are functioning normally. Separate magnetics are used for boost, inverter, and output. Each magnetic is essentially cubic in shape and carries as little current as possible.

13 Claims, 3 Drawing Sheets

LOW HEIGHT BALLAST FOR FLUORESCENT LAMPS

CROSS-REFERENCE TO RELATED APPLICATION

This application is a continuation-in-part of co-pending application Ser. No. 08/148,295, filed Nov. 8, 1993, entitled "Electronic Ballast with Low Harmonic Distortion" and assigned to the assignee of this invention.

BACKGROUND OF THE INVENTION

This invention relates to electronic ballasts for gas discharge lamps and, in particular, to an electronic ballast having a height equal to or less than one inch (2.5 cm.), which is approximately equal to the diameter of a tubular fluorescent lamp or to the smallest dimension of a folded, compact lamp.

A fluorescent lamp is a non-linear load, i.e. the current through the lamp is not proportional to the voltage across the lamp and the current will increase rapidly unless there is a ballast in series with the lamp to limit current. A "magnetic" ballast is an inductor in series with the lamp for limiting current through the lamp. The inductor includes many turns of wire wound on a laminated iron core and magnetic ballasts of the prior art are physically large and heavy, often accounting for more than half the weight of a fixture including the lamps.

A characteristic of magnetic ballasts is poor power factor. Power factor indicates whether or not a load in an AC circuit is equivalent to a pure resistance (a power factor of 1.0). If the power factor is less than 1.0, then the current and voltage are out of phase, causing increased power consumption. Regulations in many states require a high minimum power factor, e.g. 0.85, as part of energy conservation measures and the effect of these regulations is to require the use of "electronic" ballasts rather than magnetic ballasts.

Another characteristic of electronic ballasts is poor (high) harmonic distortion. Harmonic distortion is a measure of the harmonic content of an AC signal. As originally shown by the French mathematician Fourier, a square wave of a given frequency can be approximated by combining the fundamental and odd harmonics of a sinusoidal wave having the same frequency as the square wave. The waveform of the AC signal in a power line is sinusoidal and has a frequency of 60 hz. in the U.S.A. If the current drawn by a ballast is essentially in the form of square wave pulses, then the ballast is said to exhibit harmonic distortion because of the odd harmonics of 60 hz. in the current through the ballast.

One can improve the power factor of a ballast and still exhibit a large harmonic distortion. For example, a 60 hz. square wave signal can appear to have a power factor as high as 0.95. However, harmonic distortion is 30% or more. Harmonic distortion is a problem for the three-phase circuits typically found in commercial buildings because odd harmonics do not cancel out on the neutral line of a three phase system. Since the odd harmonics do not cancel out, power consumption is increased.

An electronic ballast typically includes a converter for changing the AC from a power line to direct current (DC) and an inverter for changing the DC to high frequency AC. Converting from AC to DC is usually done with a full wave or bridge rectifier. A filter capacitor on the output of the rectifier stores energy for powering the inverter. Some ballasts include a "boost" circuit to improve power factor or to increase the voltage on the filter capacitor from approximately 140 volts to 300 volts or higher (from a 120 volt AC input). The inverter changes the DC to high frequency AC at 140–300 volts for powering one or more fluorescent lamps.

Because electronic ballasts operate at a higher frequency than a power line (e.g. 30 khz compared to 50/60 hz), the "magnetics" in an electronic ballast are much smaller than the inductor in a magnetic ballast. (As used herein, "inductor" means a device having a single winding on a core, "transformer" means a device having more than one winding on a common core, and "magnetic" used as a noun is generic for either device. The core can be air, powdered ferrite, laminated iron sheets, or other material.)

Electronic ballasts are lighter than magnetic ballasts but have the disadvantage of including many more components, increasing the cost of the ballast. The magnetics in an electronic ballast contribute significantly to the size, weight, and the cost of the ballast and set a lower limit to the size of the ballast. While the magnetics can be made in almost any shape, it can be shown that the most efficient and least expensive magnetics are essentially cubic. The dimensions of the magnetics therefore set a lower limit to the smallest dimension of a ballast, herein referred to as the height or thickness of the ballast.

Boost circuits and inverters include at least one magnetic. The different functions of these magnetics, power factor correction and output, can be combined but the resulting magnetic is larger than separate magnetics for performing these functions.

The efficiency of a ballast is the power consumed by a lamp divided by the total power supplied to the lamp and the ballast. The efficiency of the magnetics in a ballast is a part of the overall efficiency, which includes transistor losses. While efficiency cannot equal one hundred percent, an efficiency of over ninety percent is desirable and attainable. A problem with ballasts of the prior art is obtaining high efficiency while using small magnetics.

An electronic ballast is not intended to be operated without a lamp. Unfortunately, it is common practice to change a lamp while power is applied to the lamp. If a lamp is not connected to the ballast, or if a lamp is defective, then the voltage on the sockets for the lamp can exceed 300 volts. This creates a hazardous situation for anyone who may come into contact with a socket.

One solution to this problem is to use a transformer as the output magnetic, thereby isolating the sockets from ground and from the fixture for the lamp. An output transformer is larger than the diameter of a fluorescent lamp even for electronic ballasts operating at high frequency. It is extremely desirable to provide a ballast that has a height less than or equal to one inch (2.5 cm.), which is approximately the diameter of the very efficient T8 lamp or the smallest dimension of a folded, compact lamp. A small height provides a lighting designer with great flexibility in locating lighting in a room.

A ballast without an output transformer is known as having a direct coupled output. Such ballasts require additional circuitry to sense fault conditions, such as a missing or defective lamp, and to shut off the ballast. A problem with fault detection circuitry is the power consumed when the lamp is operating normally, i.e. adding fault detection circuitry can decrease the efficiency of a ballast.

In view of the foregoing, it is therefore an object of the invention to provide a low cost, light weight, electronic ballast having a height of one inch (2.5 cm.) or less.

Another object of the invention is to provide an electronic ballast having high power factor, efficient magnetics, safe operation without a lamp, and small height.

A further object of the invention is to provide an electronic ballast which is efficient, fault tolerant, and has a height equal to or less than the smallest dimension of a tubular fluorescent lamp or a folded, compact lamp.

Another object of the invention is to provide an efficient electronic ballast in which the components dissipate little power and operate at low temperature for high reliability.

Another object of the invention is to provide an electronic ballast having an efficiency of greater than ninety percent, a power factor greater than ninety percent, a total harmonic distortion less than ten percent, and a height of less than one inch.

SUMMARY OF THE INVENTION

The foregoing objects are achieved in the invention in which an electronic ballast has a high voltage portion and a low voltage portion wherein the number of components in the high voltage portion are minimized. The high voltage portion includes a converter, having a variable frequency boost circuit, and a driven half-bridge inverter having a series resonant, direct coupled, parallel output. The low voltage portion of the ballast includes a control circuit and fault detectors for shutting off the boost circuit and the inverter circuit. The fault detectors consume very little power when the ballast and lamp are functioning normally. Separate magnetics are used for boost, inverter, and output. Each magnetic is essentially cubic in shape and carries as little current as possible to minimize the size of the magnetic and to minimize the height of the ballast.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
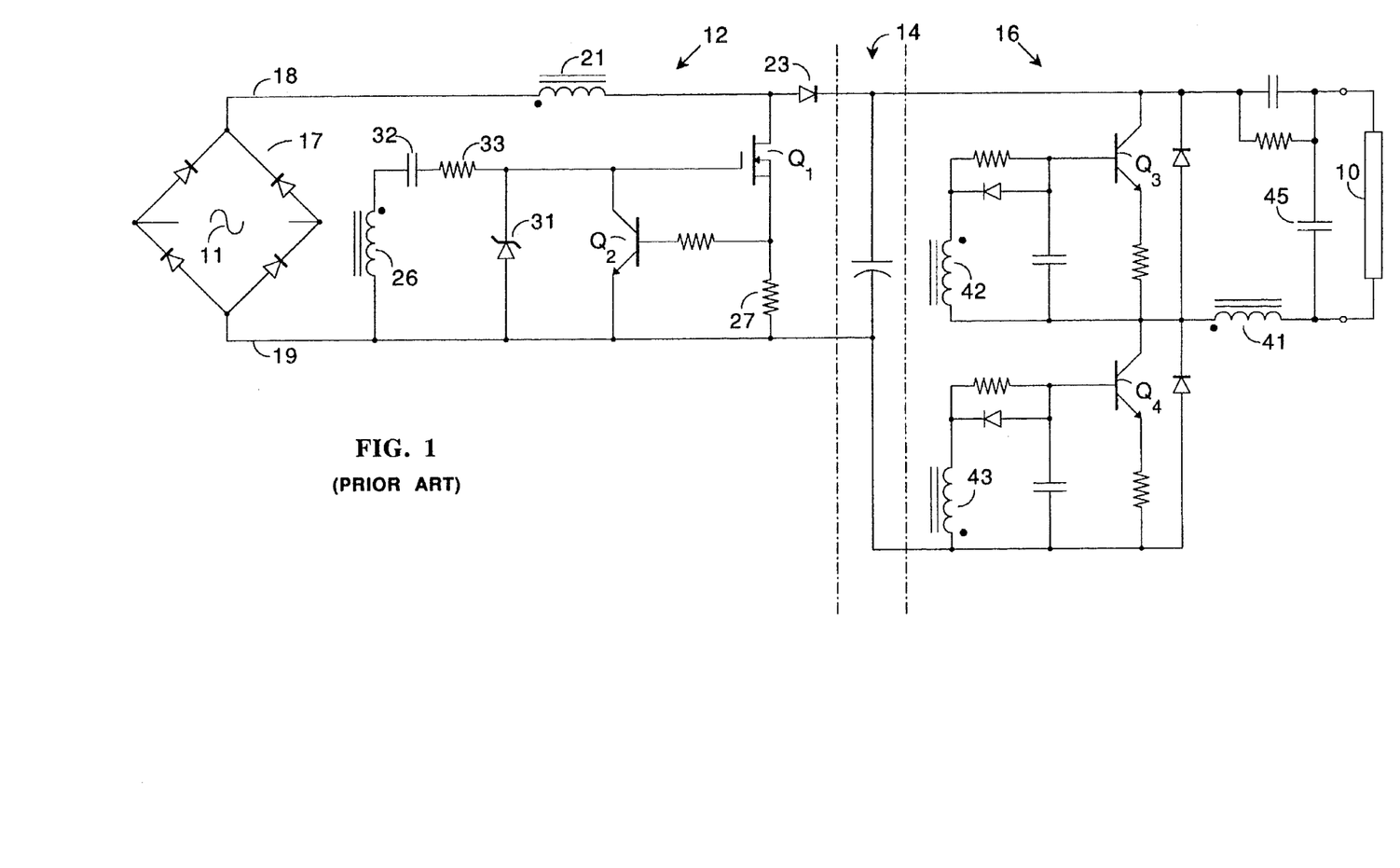
FIG. 1 is a schematic of an electronic ballast of the prior art.

FIG. 1 illustrates the major components of an electronic ballast for connecting fluorescent lamp 10 to an AC power line, represented by waveform 11. FIG. 1 is an inoperative simplification that is representative of, but not the same as, such prior art as U.S. Pat. No. 4,562,383 (Kirscher et al.) and U.S. Pat. No. 5,214,355 (Nilssen). The electronic ballast in FIG. 1 includes converter 12, energy storage capacitor 14, and inverter 16. Converter 12 rectifies the alternating current from the AC power line and stores it on capacitor 14. Inverter 16 is powered by the energy stored in capacitor 14 and provides a high frequency, e.g. 30 khz, alternating current to lamp 10.

Converter 12 includes bridge rectifier 17 having DC output terminals connected to rails 18 and 19. If rectifier 17 were simply connected to capacitor 14, then the maximum voltage on capacitor 14 would be approximately equal to the peak of the applied voltage. The voltage on capacitor 14 is increased to a higher voltage by a boost circuit including inductor 21, transistor $Q_1$, and diode 23. When transistor $Q_1$ is conducting, current flows from rail 18 through inductor 21 and transistor $Q_1$ to rail 19. When transistor $Q_1$ stops conducting, the field in inductor 21 collapses and the inductor produces a high voltage pulse which adds to the voltage from bridge rectifier 17 and is coupled through diode 23 to capacitor 14. Diode 23 prevents current from flowing back to transistor $Q_1$ from capacitor 14.

A pulse signal must be provided to the gate of transistor $Q_1$ in order to periodically turn $Q_1$ on and off to charge capacitor 14. Inductor 26 is magnetically coupled to inductor 21 and provides feedback to the gate of transistor $Q_1$, causing transistor $Q_1$ to oscillate at high frequency, i.e. a frequency at least ten times the frequency of the AC power line, e.g. 30 khz. The source of an initial pulse signal is not shown in FIG. 1.

A boost circuit and an inverter can each be self-oscillating, triggered, or driven. In addition, each can have a variable frequency or a fixed frequency. The circuit in FIG. 1 is simplified to illustrate the basic combination of converter and inverter. As illustrated in FIG. 1, the boost circuit is a variable frequency boost, unlike the boost circuits shown in the Kirscher et al. and Nilssen patents. Switch-mode power supplies use variable frequency boost circuits and typically exhibit high harmonic distortion. Resistor 27 is what makes the boost circuit of FIG. 1 have a variable frequency.

Resistor 27, in series with the source-drain path of transistor $Q_1$, provides a feedback voltage which is coupled to the base of transistor $Q_2$. When the voltage on resistor 27 reaches a predetermined magnitude, transistor $Q_2$ turns on, turning off transistor $Q_1$. Zener diode 31 limits the voltage on the gate of transistor $Q_1$ from inductor 26 and capacitor 32 and resistor 33 provide pulse shaping for the signal to the gate of transistor $Q_1$ from inductor 26. Since the voltage drop across resistor 27 will reach the predetermined magnitude sooner as the AC input voltage increases, more pulses per unit time will be produced by the boost, i.e. the frequency will increase. When the AC input voltage decreases, the frequency will decrease.

In inverter 16, transistors $Q_3$ and $Q_4$ are series connected between rails 18 and 19 and conduct alternately to provide a high frequency pulse train to lamp 10. Inductor 41 is series connected with lamp 10 and is magnetically coupled to inductors 42 and 43 for providing feedback to transistors $Q_3$ and $Q_4$ to alternately switch the transistors. The oscillating frequency of inverter 16 is independent of the frequency of converter 12 and is on the order of 25–50 khz. This is unlike the circuit described in the Kirscher et al. patent, in which the inverter and converter are synchronized.

The output of inverter 16 is a series resonant LC circuit including inductor 41 and capacitor 45. Lamp 10 is coupled in parallel with resonant capacitor 45 in what is known as a series resonant, parallel coupled or direct coupled output.

While there are many more kinds of electronic ballasts than the kind represented by FIG. 1, even given FIG. 1 there are many different ways to implement a ballast; e.g. self-oscillating, triggered, driven, fixed frequency, variable frequency. What has been found is a combination that permits high efficiency, high power factor, low harmonic distortion, and low height.

Figure 2:
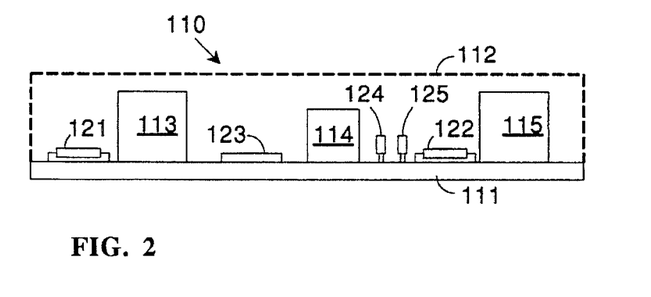
FIG. 2 illustrates the size and location of the components of of a ballast constructed in accordance with the invention.

FIG. 2 illustrates the side view of a ballast constructed in accordance with the invention. In ballast 110, printed circuit board 111 includes magnetics 113, 114, and 115 electrically connected to board 111. Also electrically connected to board 111 are resistors 121 and 122, surface mount semiconductor device 123, and capacitors 124 and 125. Not all of the components of a ballast constructed in accordance with the invention are included in FIG. 2. FIG. 2 illustrates the distribution of the components on circuit board 111. Circuit board 111 is attached to enclosure 112 which is preferably made from plastic or preformed sheet metal. As shown in FIG. 2, the largest components on circuit board 111 are the magnetics, which determine the overall height or thickness of ballast 110.

Figure 3:
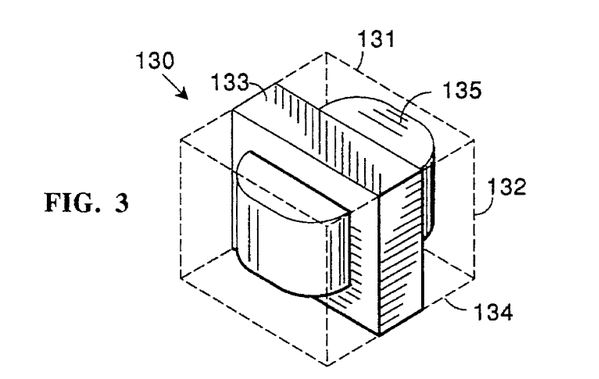
FIG. 3 is a perspective view of a magnetic used in the ballast of FIG. 2.

FIG. 3 illustrates the geometry of a magnetic in which width 131 and height 132 of magnetic 130 are determined by the dimensions of core 133, which is preferably what is known as an EE core. Depth 134 of magnetic 130 is determined by the width of windings 135. ("Height," "width," and "depth" are arbitrarily assigned and are not intended to imply any particular orientation). As described above, the most efficient and least expensive magnetic is essentially cubic to provide the largest volume within the smallest surface area. The power handling capability of a magnetic is proportional to the volume of the magnetic.

In accordance with the invention, the current through each magnetic is minimized, thereby minimizing the volume of the magnetic. As illustrated in FIG. 2, separate magnetics are used for each function in the ballast. Magnetic 113 is the magnetic for a variable frequency boost circuit, magnetic 114 is the magnetic for a driver circuit, and magnetic 115 is the output or current limiting magnetic. Current is minimized in the magnetics by the combination of a triggered, variable frequency boost circuit and a driven inverter with a series-resonant, direct coupled output.

The current through magnetic 113 is a series of small pulses of approximately constant energy. The boost/correction circuit is triggered each half cycle of the input voltage to produce a series of pulses at variable frequency, in which the frequency varies with the amplitude of the input voltage. This is unlike prior art ballasts in which constant frequency pulses increase in current with increasing input voltage. Thus, magnetic 113 is relatively small. Magnetic 114 is a small transformer driving the gates of switching transistors of a half-bridge inverter. The current in the control portion of the ballast is very small and magnetic 114 is small even though it is a transformer. The series inductor in magnetic 115 carries the lamp current, the largest current in any magnetic. Output magnetic 115 is relatively small since it contains no isolation windings. As a result of the combination of magnetics, the overall height of enclosure 112 is equal to or less than one inch (2.5 mm).

Figure 4:
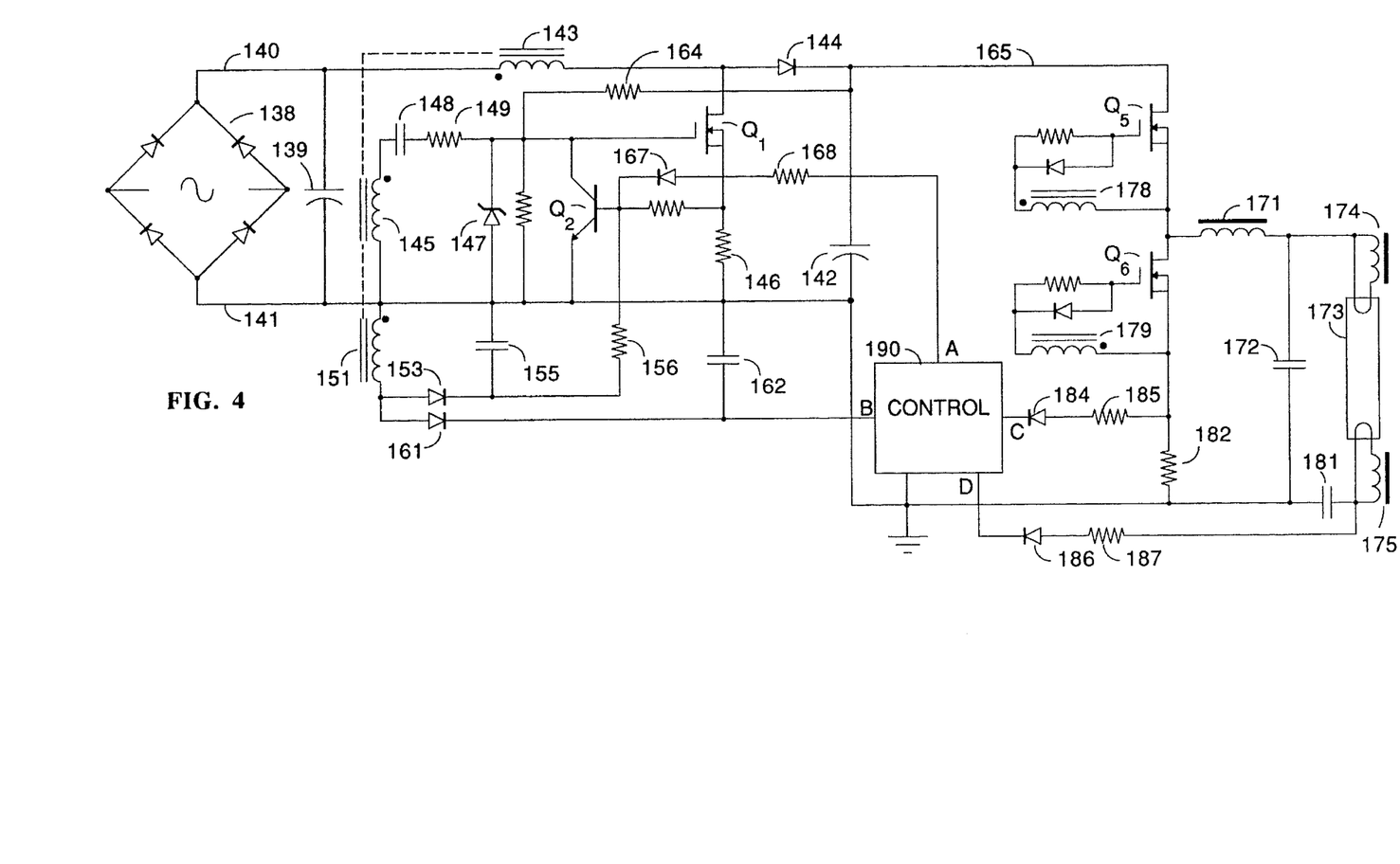
FIG. 4 is a schematic of a ballast constructed in accordance with a preferred embodiment of the invention.

FIG. 4 is a schematic for a ballast in which current is minimized in the magnetics without loss of efficiency. The AC input of the ballast includes bridge rectifier 138 having DC output terminals connected to capacitor 139 by rails 140 and 141. When transistor $Q_1$ is conducting, current flows from rail 140 through inductor 143 and transistor $Q_1$ to rail 141. When transistor $Q_1$ stops conducting, the field in inductor 143 collapses and the inductor produces a high voltage which adds to the voltage from bridge rectifier 138 and is coupled through diode 144 to capacitor 142. Diode 144 prevents current from flowing back to transistor $Q_1$ from capacitor 142.

Inductor 145 is magnetically coupled to inductor 143 and provides feedback to the gate of transistor $Q_1$, causing transistor $Q_1$ to oscillate at high frequency, e.g. 130 khz. Resistor 146, in series with the source-drain path of transistor $Q_1$, provides a feedback voltage which is coupled to the base of transistor $Q_2$. When the voltage on resistor 146 reaches a predetermined magnitude, transistor $Q_2$ turns on, turning off transistor $Q_1$. Resistor 146 typically has a small value, e.g. 0.5 ohms. Zener diode 147 limits the voltage on the gate of transistor $Q_1$ from inductor 145 and capacitor 148 and resistor 149 provide pulse shaping for the signal to the gate of transistor $Q_1$ from inductor 145.

The current through inductor 143 is controlled by the voltage drop across resistor 146. Each pulse from inductor 143 is a small current pulse to charge capacitor 142. The number of pulses per unit time, i.e. the frequency of the pulses, increases with increasing input voltage but the current through inductor 143 does not increase. This enables one to use a smaller inductor and reduce the size of the ballast.

Inductor 151 is magnetically coupled to inductors 143 and 145. The voltage induced in inductor 151 therefore includes a high frequency component from the operation of transistor $Q_1$ and a low frequency component from the ripple voltage. The voltage from inductor 151 is coupled to a ripple detector including diode 153 and capacitor 155. The rectified voltage on capacitor 155 is coupled to the control electrode of transistor $Q_2$ by resistor 156. This portion of the circuit significantly improves power factor and harmonic distortion by varying the conduction of transistor $Q_1$ in phase with the ripple voltage on capacitor 139.

The boost circuit provides both low voltage, e.g. five volts, for powering other components of the ballast, and high voltage, e.g. 300 volts, for powering one or more lamps. Diode 161 is connected to inductor 151 and capacitor 162 connected between diode 161 and rail 141. The junction between diode 161 and capacitor 162 is connected by line 13 to control circuit 190, supplying a filtered, DC voltage, e.g. five volts, for powering the control circuit. Inductor 151 thus serves two functions and is physically small since it is in the low voltage, low current portion of the ballast, thereby improving the efficiency of the ballast and contributing to the low height of the ballast.

Resistor 164, connected between high voltage rail 165 and the gate of transistor $Q_1$, provides a DC path through the boost circuit for causing the boost circuit to begin oscillation, i.e. the boost circuit is self-oscillating. Resistor 164 has a high resistance, e.g. 660,000 ohms, and is of negligible effect once the boost circuit is oscillating. The boost circuit oscillates during each half cycle of the rectified input voltage, i.e. the boost circuit restarts 120 times per second with the bias provided from resistor 164. Line A is coupled to the base of transistor $Q_2$ through diode 167 and resistor 168. As more fully described with FIG. 5, a positive voltage on line A turns on transistor $Q_2$ and quenches oscillation of the boost circuit.

Transistors $Q_5$ and $Q_6$ are connected in series between high voltage rail 165 and ground rail 141. One side of inductor 171 is connected to the junction of transistors $Q_5$ and $Q_6$. Capacitor 172 is connected between the other side of inductor 171 and ground, forming a series resonant LC circuit. Lamp 173 is connected in parallel with resonant capacitor 172. Inductors 174 and 175 are magnetically coupled to inductor 171 and provide power for the filaments of lamp 173. Transistors $Q_5$ and $Q_6$ alternately conduct at a frequency determined by control circuit 190 which is magnetically coupled to transistors $Q_5$ and $Q_6$ by inductors 178 and 179. The lamp current, e.g. 400 ma., flows through inductor 171, making this magnetic the largest in the ballast. Inductors 174 and 175, wound on a common core with inductor 171, are only three turns each and are small in size. Inductors 178 and 179 pass very little current and are part of the smallest magnetic in the ballast.

Capacitor 181 is connected in series with lamp 173 across resonant capacitor 172. The voltage drop across capacitor 181 is coupled by diode 186 and resistor 187 to input D of control circuit 190. When lamp 173 is connected to the ballast and the ballast is operating normally, the voltage across capacitor 181 is approximately one-half the voltage between rail 165 and rail 141. In the absence of a lamp, or if a lamp is defective, then the voltage across capacitor 181 is considerably lower or zero. This low voltage is detected by control circuit 190 and the ballast is shut-off.

Capacitor 181 serves two functions. It blocks DC through the lamps and acts as a sensor for lamp failure or removal. In either function, capacitor 181 dissipates essentially no power and enhances the efficiency and safety of the ballast.

Resistor 182 is in series with transistors $Q_5$ and $Q_6$ and converts the current through transistor $Q_6$ to a voltage which is coupled to input C by diode 184 and resistor 185. An excessively high voltage across resistor 182 causes the ballast to shut off. Resistor 182 has a low resistance, e.g. one ohm or less, and dissipates little power.

Figure 5:
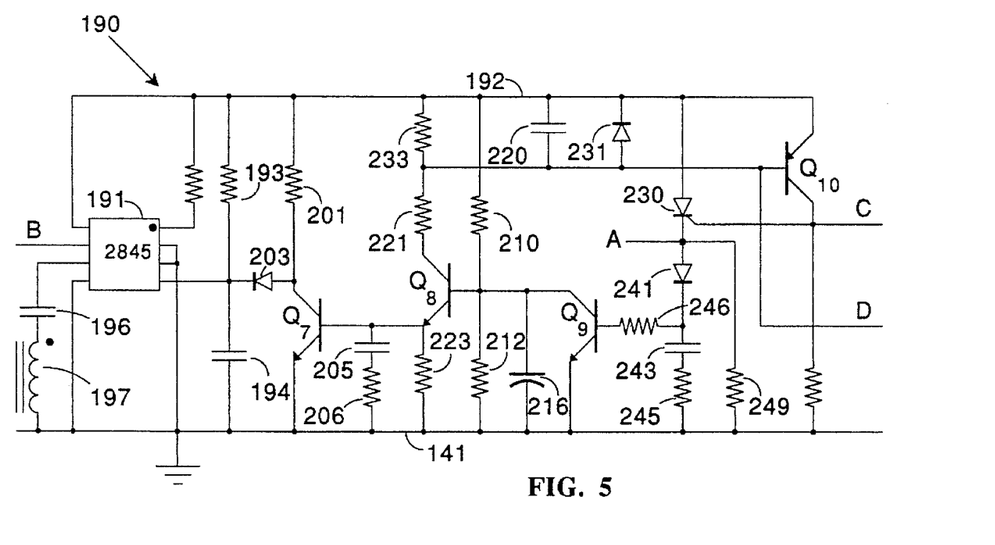
FIG. 5 is a schematic of the control circuit illustrated in block form in FIG. 4.

FIG. 5 is a schematic of control circuit 190. Lines A and B of FIG. 5 correspond to lines A and B of FIG. 4. Lines C and D of FIG. 5 connect to to inputs C and D of control circuit 190 in FIG. 4.

Driver circuit 191 is powered from line B and produces local, regulated output voltage which drives rail 192 to approximately five volts. In one embodiment of the invention, driver circuit 191 was a 2845 pulse width modulator circuit. Pin 1 of driver circuit 191 is indicated by a dot and the pins are numbered consecutively clockwise. The particular chip used to implement the invention included several capabilities which are not needed, i.e. the invention can be implemented with a much simpler integrated circuit such as a 555 timer chip.

Pin 1 of driver circuit 191 relates to an unneeded function and is tied high. Pins 2 and 3 relate to unneeded functions and are grounded. Pin 4 is the frequency setting input and is connected to the junction of resistor 193 and capacitor 194. Pin 5 is electrical ground for driver circuit 191 and is connected to rail 141. Pin 6 of driver circuit 191 is the high frequency output and is coupled through capacitor 196 to inductor 197. Inductor 197 is magnetically coupled to inductor 178 and to inductor 179 (FIG. 4). As indicated by the small dots adjacent each inductor, inductors 178 and 179 are oppositely poled, thereby causing transistors $Q_5$ and $Q_6$ to switch alternately at a frequency determined by resistor 173, capacitor 174, and the voltage on rail 192.

Pin 7 of driver circuit 191 is connected to line B, the low voltage output of the boost circuit in FIG. 4. Pin 8 of driver circuit 191 is a voltage output for providing bias to the frequency determining network including resistor 193 and capacitor 194 which are series-connected between rail 192 and rail 141. Pin 8 is connected to rail 192 to provide voltage for the rest of the circuitry illustrated in FIG. 4.

When power is applied to the ballast, the boost circuit produces both a high voltage output and a low voltage output. The low voltage output is coupled by line B to driver circuit 191 which powers rail 192. Initially, transistors $Q_7$, $Q_8$, and $Q_9$ are non-conducting. As soon as driver circuit 191 begins operation and produces a voltage on rail 192, current #lows through a first timer circuit including resistor 210 and capacitor 216. Capacitor 216 charges to a voltage determined by the voltage divider including series connected resistors 210 and 212 and this voltage is sufficient to turn on transistor $Q_8$. When transistor $Q_8$ turns on, transistor $Q_7$ is turned on.

Resistor 201 and transistor $Q_7$ are series-connected between rails 192 and 141. When transistor $Q_7$ is non-conducting, resistor 201 is connected in parallel with resistor 193 through diode 203. When resistor 201 is connected in parallel with resistor 193, the combined resistance is substantially less than the resistance of resistor 193 alone and the frequency of operation of driver circuit 191 is substantially higher than the resonant frequency of the LC output circuit. At this point, the output voltage across the resonant capacitor is not high enough to start lamp 173 (FIG. 4). However, the voltage drop is large across inductor 171 and a substantial current is coupled to the filaments of lamp 173 by inductors 174 and 175.

After the lamp has warmed up a predetermined length of time, e.g. 0.75 seconds, determined by capacitor 205 and resistor 206, transistor $Q_7$ conducts, thereby reverse biasing diode 203 and disconnecting resistor 201 from resistor 193. When diode 203 is reverse biased, the current into capacitor 194 is substantially reduced, the frequency of driver circuit 191 decreases to approximately the resonant frequency of inductor 171 and capacitor 172, the output voltage across capacitor 172 increases, and the current through inductor 171 decreases. During normal operation, the inverter frequency is constant.

When transistor $Q_8$ conducts, current flows through a shut-off timer including capacitor 220 and series connected resistor 221. If no lamp is connected to the ballast, capacitor 220 charges to a voltage determined by the voltage drop across resistor 233, turning on transistor $Q_{10}$. When transistor $Q_{10}$ turns on, line A is coupled to rail 192 and current flows through diode 241 to the base of transistor $Q_9$, turning on transistor $Q_9$.

In FIG. 4, line A is coupled through resistor 168 and diode 167 to the base of transistor $Q_2$. A positive voltage on line A turns on transistor $Q_2$, thereby turning off transistor $Q_1$ and shutting off the boost circuit. With the boost circuit shut off, the voltage on line B decays and driver circuit 191 (FIG. 5) ceases operation, shutting off the inverter. Since driver circuit 191 is turned off, the voltage on rail 192 collapses, shutting off SCR 230.

The control circuit does not require a holding current for SCR 230 to prevent the inverter and the boost circuit from operating. On the contrary, the operating voltage is removed from SCR 230, turning off the SCR and preventing the SCR from latching on. Cascaded timer circuits prevent the ballast from turning on immediately. The shut-off mechanism is entirely within the low voltage, low power portion of the ballast, further reducing power consumption when the ballast is shut off.

The shut-off circuit including transistor $Q_{10}$ is prevented from turning off the ballast by an opposing current from input D. As illustrated in FIG. 4, input D is coupled through diode 186 and resistor 187 to the junction between lamp 173 and capacitor 181. With lamp 173 in place and operating normally, capacitor 181 charges to approximately half the voltage between rail 165 and rail 141.

Resistor 187 and diode 186 provide a resistive current path from sense capacitor 181 to capacitor 220 (FIG. 4). The current from input D opposes and is greater than the charging current through $Q_8$, causing the net voltage across capacitor 220 to forward-bias diode 231 as capacitor 220 charges from input D. When diode 231 is forward-biased, then the base-emitter junction of transistor $Q_{10}$ is reverse-biased, transistor $Q_{10}$ is rendered non-conducting, and the shut-off circuit is reset. Since transistor $Q_{10}$ is non-conducting, the gate of SCR 230 is not coupled to rail 192, the SCR remains non-conducting, and the inverter continues to operate. The net voltage across capacitor 220 determines whether or not the ballast is turned off.

In FIG. 4, the current through transistors $Q_5$ and $Q_6$ is converted into a voltage by series resistor 182. This voltage is coupled to input C by resistor 185 and diode 184. Input C is directly connected to the gate of SCR 230 (FIG. 4) and an excess voltage across resistor 182 causes SCR 230 to conduct, shutting off the ballast. This portion of the circuit protects the ballast when a lighted lamp is removed from an operating ballast. When the lamp is removed, the output voltage of the inverter rises swiftly and the corresponding voltage across resistor 182 triggers SCR 230, raising the operating frequency instantly, before the shut-off circuit can operate, thereby lowering the output voltage to a safe level.

As used herein, shutting off the ballast means reducing the output voltage either to a safe level or to zero volts. When SCR 230 conducts, transistors $Q_9$, $Q_8$, and $Q_7$ cause the frequency of the AC output to increase, thereby reducing the voltage drop across the resonant capacitor. Even if the boost circuit is turned off, the charge on capacitor 162 (FIG. 4) is sufficient to power driver circuit 191 for forty milliseconds or so. Thus, the frequency is raised to protect someone coming in contact with the ballast. Driver circuit 191 is turned off to prevent SCR 230 from latching. When driver circuit 191 turns off, the output voltage from the ballast goes to zero. After a predetermined delay, the start-up sequence begins.

In FIG. 5, when SCR 230 conducts, diode 241 is forward-biased and current flows through capacitor 243 and resistor 245. The voltage drop across resistor 245 causes the base-emitter junction of transistor $Q_9$ to become forward-biased and transistor $Q_9$ conducts, connecting the base of transistor $Q_8$ to rail 141 and discharging capacitor 216. Even after driver circuit 191 ceases operation, capacitor 243 keeps transistor $Q_9$ conducting, thereby preventing the ballast from restarting for a period determined by the RC time constant of a second timer circuit including capacitor 243 and resistors 245 and 2146. Because the timing circuits are cascaded, the periods defined by the first and second timing circuits are consecutive and add up to a delay in excess of one second.

After capacitor 243 has discharged, transistor $Q_9$ turns off, permitting capacitor 216 to begin charging. If the AC input voltage has not been interrupted, the boost circuit will attempt to restart the driver circuit by producing a voltage on line B. However, because transistor $Q_9$ is not conducting, transistor $Q_7$ is not conducting and the output frequency of the inverter is considerably higher than the resonant frequency of inductor 171 and capacitor 172 (FIG. 4). Thus, the output voltage across capacitor 172 is quite low.

When transistor $Q_9$ stops conducting, capacitor 216 can begin to charge, thereby turning on transistor $Q_8$ and transistor $Q_7$, reducing the frequency of drive circuit 191 approximately to the resonant frequency of the LC output and increasing the voltage across capacitor 172. If the fault condition still exists, the ballast shuts off again within 125 milliseconds, attempts a re-strike after about 1.5 seconds and the cycle continues until the fault is corrected or the AC input voltage is interrupted.

As related to FIG. 20 magnetic 113 includes inductors 143, 145, and 151 (FIG. 4) on a common core; magnetic 114 includes inductors 178, 179 (FIG. 4) and inductor 197 (FIG. 5) on a common core; and magnetic 115 includes inductors 171, 174, and 175 (FIG. 4) on a common core.

The invention thus provides a low cost, light weight, efficient, fault tolerant, ballast having a height equal to or less than one inch. The ballast includes a self-oscillating, variable frequency boost circuit, a driven inverter having a series resonant, direct coupled output, and a low voltage control circuit for driving the inverter and responding to fault conditions. The ballast illustrated in FIGS. 4 and 5 can supply at least sixty watts to a load at an efficiency of approximately ninety-two percent and a total harmonic distortion of about six percent.

Having thus described the invention, it will be apparent to those of skill in the art that various modifications can be made within the scope of the invention. For example, a boost-type power factor correction stage can be replaced by a buck boost or other type converter having a variable frequency. The series resonant output inductor could be constructed as two windings on the same core, with the resonant capacitor connected between them. The switching transistors of the half-bridge inverter can be driven by solid state level shifters or opto-isolators instead of transformers. A self-oscillating inverter could also be used. An EE core is preferred but other core shapes, e.g. an EI core, can be used for the magnetics. A PNP-NPN transistor pair can be substituted for an SCR.

We claim:

1. An electronic ballast for powering a gas discharge lamp from an AC input voltage, said ballast having a height equal to or less than one inch, a power factor $\geq 0.9$, and a harmonic distortion $\leq 10$ percent, said ballast comprising:

a converter for converting said AC input voltage into pulses of direct current at a high voltage, said converter including means for varying the current drawn by said converter in phase with said AC input voltage by changing the frequency of said pulses;

a capacitor coupled to the output of said converter for storing said high voltage;

a driven, half-bridge inverter powered by the energy stored in said capacitor, said inverter having a series resonant, direct coupled output for connection to said lamp;

wherein said converter includes a first magnetic and said inverter includes a second magnetic and said first magnetic and said second magnetic have separate cores.

2. The ballast as set forth in claim 1 wherein said inverter is driven and said ballast further comprises:

a control circuit including an output coupled to said converter for shutting off said converter.

3. The ballast as set forth in claim 2 wherein said control circuit includes a third magnetic, wherein said third magnetic has a core separate from said first magnetic and said second magnetic.

4. The ballast as set forth in claim 3 wherein each magnetic is wound on an EE core.

5. The ballast as set forth in claim 4 wherein the magnetics have an approximately cubic shape.

6. The ballast as set forth in claim 2 wherein said converter also converts said alternating current into a direct current at a low voltage and said control circuit is powered by said direct current at low voltage.

7. The ballast as set forth in claim 2 wherein said control circuit includes circuitry for shutting off said ballast in the event of a fault condition.

8. The ballast as set forth in claim 7 and further including a sense capacitor in series with said lamp, wherein said sense capacitor is coupled to said circuitry for shutting off said ballast.

9. The ballast as set forth in claim 1 wherein the frequency of said converter varies with the amplitude of said AC input voltage.

10. An electronic ballast for powering a gas discharge lamp from an AC input voltage, said ballast having a height equal to or less than one inch, said ballast comprising:

a self-oscillating converter for converting said AC input voltage into pulses of direct current at a high voltage, said converter including means for varying the current drawn by said converter in phase with said AC input voltage by changing the frequency of said pulses;

a driven, half-bridge inverter, said inverter having a series resonant, direct coupled output for connection to said lamp;

a control circuit coupled to said inverter for driving said inverter at a predetermined frequency;

said converter includes a first magnetic, said direct coupled output includes a second magnetic, and said control circuit includes a third magnetic, wherein each magnetic is on a separate core.

11. The ballast as set forth in claim 10 wherein said converter also converts said alternating current into a direct current at a low voltage and said control circuit is powered by said direct current at low voltage.

12. The ballast as set forth in claim 10 wherein said converter includes means for varying the frequency of said converter in phase with the amplitude of said AC input voltage.

13. The ballast as set forth in claim 10 wherein said converter includes:

a full wave rectifier for rectifying said AC input voltage; and means for varying said direct current in phase with a ripple component of the rectified AC input voltage.

* * * * *

US005500576B1

(12) REEXAMINATION CERTIFICATE (4505th)
United States Patent
Russell et al.

(10) Number: US 5,500,576 C1
(45) Certificate Issued: Dec. 18, 2001

(54) LOW HEIGHT BALLAST FOR FLUORESCENT LAMPS

(75) Inventors: Randy G. Russell, Glen Ellyn; Kent E. Crouse, Hanover Park; Peter W. Shackle, Arlington Heights; Ronald J. Bezdon, Antioch, all of IL (US)

(73) Assignee: Energy Savings, Inc., Schaumburg, IL (US)

Reexamination Request:
No. 90/005,223, Jan. 19, 1999

Reexamination Certificate for:
Patent No.: 5,500,576
Issued: Mar. 19, 1996
Appl. No.: 08/227,953
Filed: Apr. 15, 1994

Related U.S. Application Data (63) Continuation-in-part of application No. 08/148,295, filed on Nov. 8, 1993.

(51) Int. Cl.$^7$ .................................................. H05B 37/02
(52) U.S. Cl. .................... 315/307; 315/206; 315/209 R; 315/DIG. 5
(58) Field of Search .................................... 315/206, 219, 315/244, 307, DIG. 5, 225, 209 R, 247, DIG. 7, 291

(56) References Cited

U.S. PATENT DOCUMENTS

| 4,459,516 | * | 7/1984 | Zelina et al. | 315/209 R |
| 5,049,790 |   | 9/1991 | Herfurth et al. | 315/291 |
| 5,258,692 | * | 11/1993 | Jones | 315/247 |
| 5,317,237 | * | 5/1994 | Allison et al. | 315/307 |
| 5,373,218 | * | 12/1994 | Konopka et al. | 315/291 |

OTHER PUBLICATIONS

Siemens Application Note, TDA4814, Siemens Components 3/86—p. 103–107.

* cited by examiner

*Primary Examiner*—David Vu (57) ABSTRACT

An electronic ballast has a high voltage portion and a low voltage portion. The high voltage portion includes a converter, having a variable frequency boost circuit, and a half-bridge, driven inverter having a series resonant, direct coupled output. The low voltage portion of the ballast includes a control circuit and fault detectors for shutting off the boost circuit and the inverter circuit. The fault detectors consume very little power when the ballast and lamp are functioning normally. Separate magnetics are used for boost, inverter, and output. Each magnetic is essentially cubic in shape and carries as little current as possible.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–13 is confirmed.

Claims 1, 2, 7 and 9 are cancelled.

Claims 3, 6 and 8 are determined to be patentable as amended.

Claims 4 and 5 dependent on an amended claim, are determined to be patentable.

New claims 14 and 15 are added and determined to be patentable.

3. [The ballast as set forth in claim 2] *An electronic ballast for powering a gas discharge lamp from an AC input voltage, said ballast having a height equal to or less than one inch, a power factor $\geq 0.9$, and a harmonic distortion $\leq 10$ percent, said ballast comprising:*
   *a converter for converting said AC input voltage into pulses of direct current at a high voltage, said converter including means for varying the current drawn by said converter in phase with said AC input voltage by changing the frequency of said pulses;*
   *a control circuit including an output coupled to said converter for shutting off said converter;*
   *a capacitor coupled to the output of said converter for storing said high voltage;*
   *a driven, half-bridge inverter powered by the energy stored in said capacitor, said inverter having a series resonant, direct coupled output for connection to said lamp;*
   *wherein said converter includes a first magnetic and said inverter includes a second magnetic and said first magnetic and said second magnetic have separate cores; and*
   wherein said control circuit includes a third magnetic[, wherein] *and* said third magnetic has a core separate from said first magnetic and said second magnetic.

6. [The ballast as set forth in claim 2] *An electronic ballast for powering a gas discharge lamp from an AC input voltage, said ballast having a height equal to or less than one inch, a power factor $\geq 0.9$, and a harmonic distortion $\leq 10$ percent, said ballast comprising:*
   *a converter for converting said AC input voltage into pulses of direct current at a high voltage, said converter including means for varying the current drawn by said converter in phase with said AC input voltage by changing the frequency of said pulses;*
   *a control circuit including an output coupled to said converter for shutting off said converter;*
   *a capacitor coupled to the output of said converter for storing said high voltage;*
   *a driven, half-bridge inverter powered by the energy stored in said capacitor, said inverter having a series resonant, direct coupled output for connection to said lamp;*
   *wherein said converter includes a first magnetic and said inverter includes a second magnetic and said first magnetic and said second magnetic have separate cores; and*
   wherein said converter also converts said alternating current into a direct current at a low voltage and said control circuit is powered by said direct current at low voltage.

8. The ballast as set forth in claim [7] *6 wherein said control circuit includes circuitry for shutting off said ballast in the event of a fault condition* and further including a sense capacitor in series with said lamp, wherein said sense capacitor is coupled to said circuitry for shutting off said ballast.

*14. An electronic ballast for powering a gas discharge lamp from an AC input voltage, said ballast having a height equal to or less than one inch, a power factor $\geq 0.9$, and a harmonic distortion $\leq 10$ percent, said ballast comprising:*
   *a converter for converting said AC input voltage into pulses of direct current at a high voltage, said converter including means for varying the current drawn by said converter in phase with said AC input voltage by changing the frequency of said pulses;*
   *a control circuit including an output coupled to said converter for shutting off said converter;*
   *a capacitor coupled to the output of said converter for storing said high voltage;*
   *a driven, half-bridge inverter powered by the energy stored in said capacitor, said inverter having a series resonant, direct coupled output for connection to said lamp;*
   *wherein said half-bridge inverter includes two, series connected switching transistors and a resistor in series with said switching transistors, said resistor being coupled to said control circuit for providing an indication of excess output voltage; and*
   *wherein said converter includes a first magnetic and said inverter includes a second magnetic and said first magnetic and said second magnetic have separate cores.*

*15. The ballast as set forth in claim 8 wherein said sense capacitor is also a DC blocking capacitor.*

\* \* \* \* \*